United States Patent [19]
Gold et al.

[11] Patent Number: 5,779,248
[45] Date of Patent: Jul. 14, 1998

[54] WHEELED CHILD CARRIER

[75] Inventors: Nancy Gold, Schenectady; Carl Legere, Charlton; Christine Gauss, Scotia; Charles Howarth, Schenectady, all of N.Y.

[73] Assignee: Tough Traveler, Ltd., Schenectady, N.Y.

[21] Appl. No.: 514,116

[22] Filed: Aug. 11, 1995

[51] Int. Cl.⁶ .................................................. B62B 9/12
[52] U.S. Cl. .................. 280/30; 224/153; 224/155; 280/648; 280/47.25
[58] Field of Search .................. 280/30, 643, 645, 280/646, 648, 652, 47.18, 47.315, 47.25; 224/153, 155, 160, 161

[56] References Cited

U.S. PATENT DOCUMENTS

| | | | |
|---|---|---|---|
| 3,550,997 | 12/1970 | Strand | 280/47.18 X |
| 4,157,837 | 6/1979 | Kao | 224/161 X |
| 4,362,307 | 12/1982 | Nakatani | 224/153 X |
| 4,632,409 | 12/1986 | Hall et al. | 280/648 X |
| 4,747,526 | 5/1988 | Launes | 224/161 X |
| 4,762,256 | 8/1988 | Whitaker | 224/161 |
| 4,921,261 | 5/1990 | Sadler et al. | 280/648 X |
| 5,364,112 | 11/1994 | Jackson | 280/30 |
| 5,383,585 | 1/1995 | Weiss | 280/30 X |
| 5,492,347 | 2/1996 | Palmeri et al. | 280/30 X |

*Primary Examiner*—Brian L. Johnson
*Assistant Examiner*—Michael Mar
*Attorney, Agent, or Firm*—Schmeiser, Olsen & Watts

[57] ABSTRACT

The present invention provides a releasably mounted retrofit system that allows a standard back-mounted child carrier to also serve as a stroller. The retrofit system comprises an adjustable handlebar apparatus and a wheel unit. Both of these can be releasably mounted to the rear frame of an existing back-mounted child carrier thereby allowing existing carriers to also function as strollers.

14 Claims, 9 Drawing Sheets

WHEELED CHILD CARRIER

FIELD OF THE INVENTION

The present invention relates generally to hybrid back-mounted child carriers/push strollers. In particular, the present invention is concerned with a wheeled retrofit system releasably attachable to an existing back-mounted child carrier.

BACKGROUND OF THE INVENTION

Presently, there are a variety of back mounted child carriers available on the market such as those designed and sold by TOUGH TRAVELER®. Such carriers utilize a shoulder harness that allows an adult to carry an infant or small child on the adult's back. These back mounted child carriers typically are constructed from aluminum tubular framing and nylon materials for seating and padding. Such designs are particularly advantageous when the adult is hiking or traveling on a terrain where a carriage or stroller is not a practical solution for transporting an infant or young child.

However, even given the relative comfort and ease of use of the child carriers, there may be times when it is desirable to remove the child and the carrier from the adult's back and stroll the child rather than carry the child. Thus, hybrid carrier/stroller devices which can function as both have recently been made available. Presently, there exist several vendors, such as EVENFLO® who provide combination child carrier/child stroller contraptions.

Unfortunately, these vendors only provide units that are all-in-one designs. This is not always an ideal solution since many users, who use such devices primarily as carriers, may find it undesirable to have to deal with the added weight and bulkiness of a carrier bogged down with additional components such as wheels and a handlebar. In other words, many users may not want to be locked into a hybrid design. In addition, for those users who presently have an existing child carrier, purchasing an entirely new piece of equipment to serve both purposes is more costly.

Until now, no device has existed which can be mounted to an existing child carrier to maintain the convenient features of a light weight child carrier while also providing a child stroller device. Nor do any vendors provide a releasably mountable retrofit system which can be easily attached and removed from an existing child carrier as required by the user. The present invention seeks to provide this functionality.

SUMMARY OF THE INVENTION

Briefly, the present invention provides a simple retrofit attachment system that allows a back mounted child carrier to be converted into a hybrid child carrier/stroller without sacrificing any of the advantages of the child carrier.

The present invention comprises a handlebar apparatus and a wheel unit, both of which can be releasably mounted to the tubular framing of an existing child carrier. The handlebar apparatus and wheel unit are designed such that they can be easily attached and removed as needed by the user.

More particularly, the handlebar apparatus may be designed such that it can telescope up to provide a suitable height when strolling the infant and telescope down when carrying the infant. Additionally, the wheel unit may be designed such that it can collapse thereby providing an even more compact design when the system is used as a back-mounted child carrier and not as stroller. Finally, the wheel unit and the handlebar apparatus may include a single mounting bracket capable of connecting both devices easily to the existing child carrier. Such a unit increases the ease by which both the handlebar apparatus and wheel unit may be attached.

Another advantage of the present invention is a detachable wheel unit having curvilinear tubular supports for providing increased structural integrity. The curvilinear shape allows for supporting greater loads.

In accordance with the above, it is an object of the present invention to provide a retrofit device that will allow a child carrier to be converted into a hybrid carrier/stroller.

In accordance with the above, it is a further object of the present invention to provide a releasably attachable retrofit system.

BRIEF DESCRIPTION OF THE DRAWINGS

These and other advantages of the present invention will become more readily apparent upon reading the following detailed description and upon reference to the drawings to which.

DETAILED DESCRIPTION OF THE PREFERRED EMBODIMENTS

Figure 1:
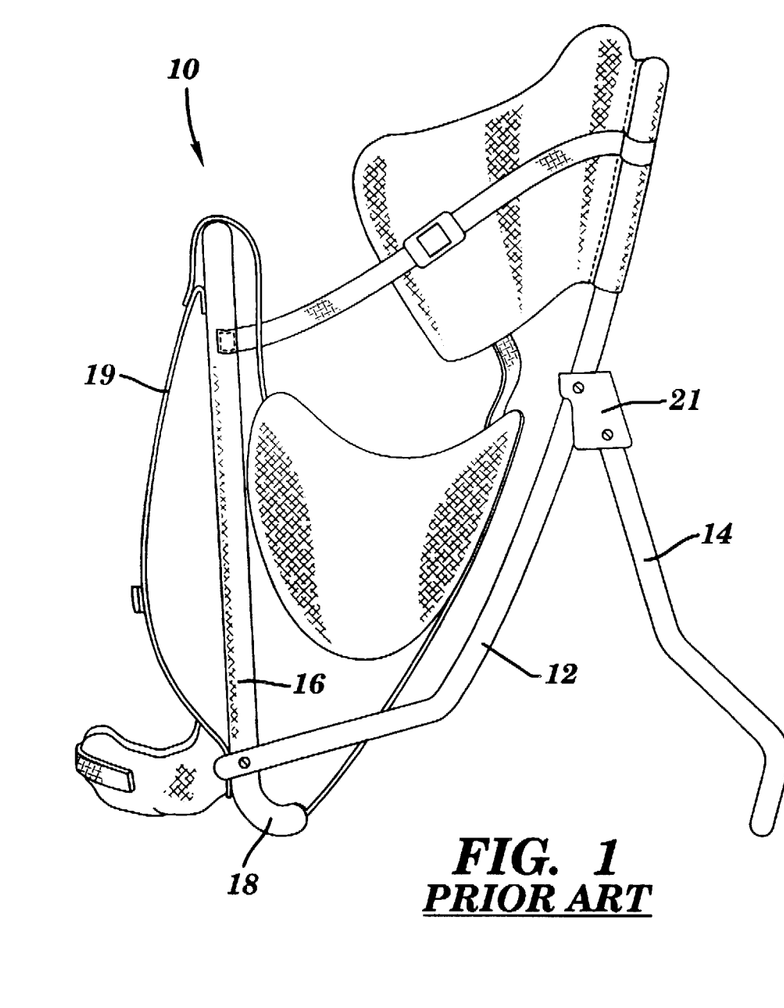
FIG. 1 is a side view of a typical existing child carrier.

Referring now to the drawings, and more particularly to FIG. 1, there is shown a side view of a typical back-mounted child carrying device 10 as manufactured by TOUGH TRAVELER®. The carrier utilizes a system of tubular framing 12, 14 and 16, various straps and nylon padding, and a shoulder harness 19. The child sits in the carrier 10 facing forward (i.e., facing towards the shoulder harness).

The tubular framing generally consists of three pieces, a forward support frame member 16, a rear support frame member 12, and a frame stand member 14.

Figure 2:
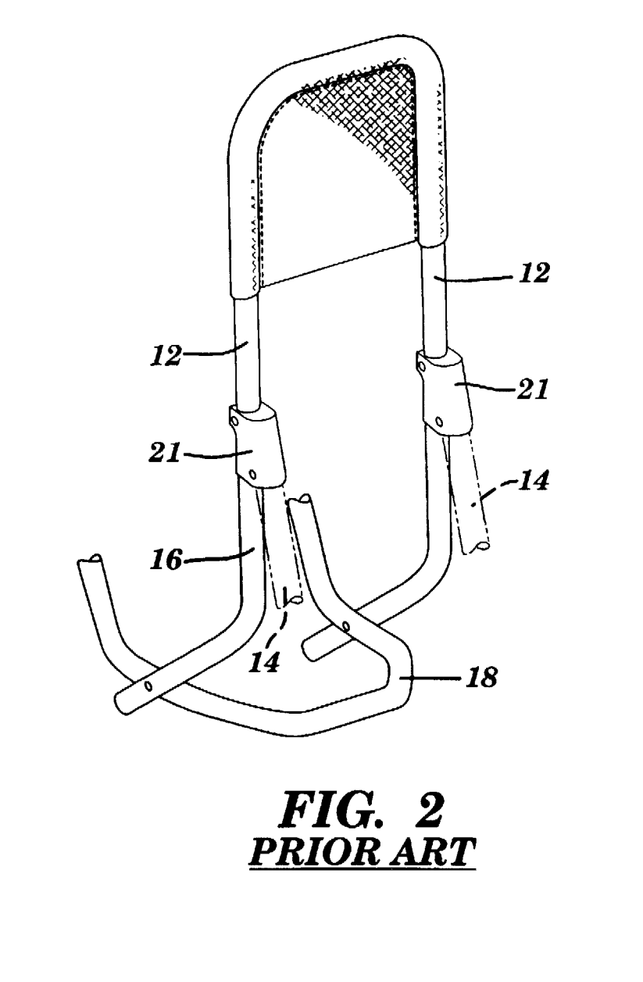
FIG. 2 is a rear view of a portion of the frame of an existing child carrier.

FIG. 2 depicts a rear view of the rear support frame member 12 and part of the forward support frame member 16.

Figure 3:
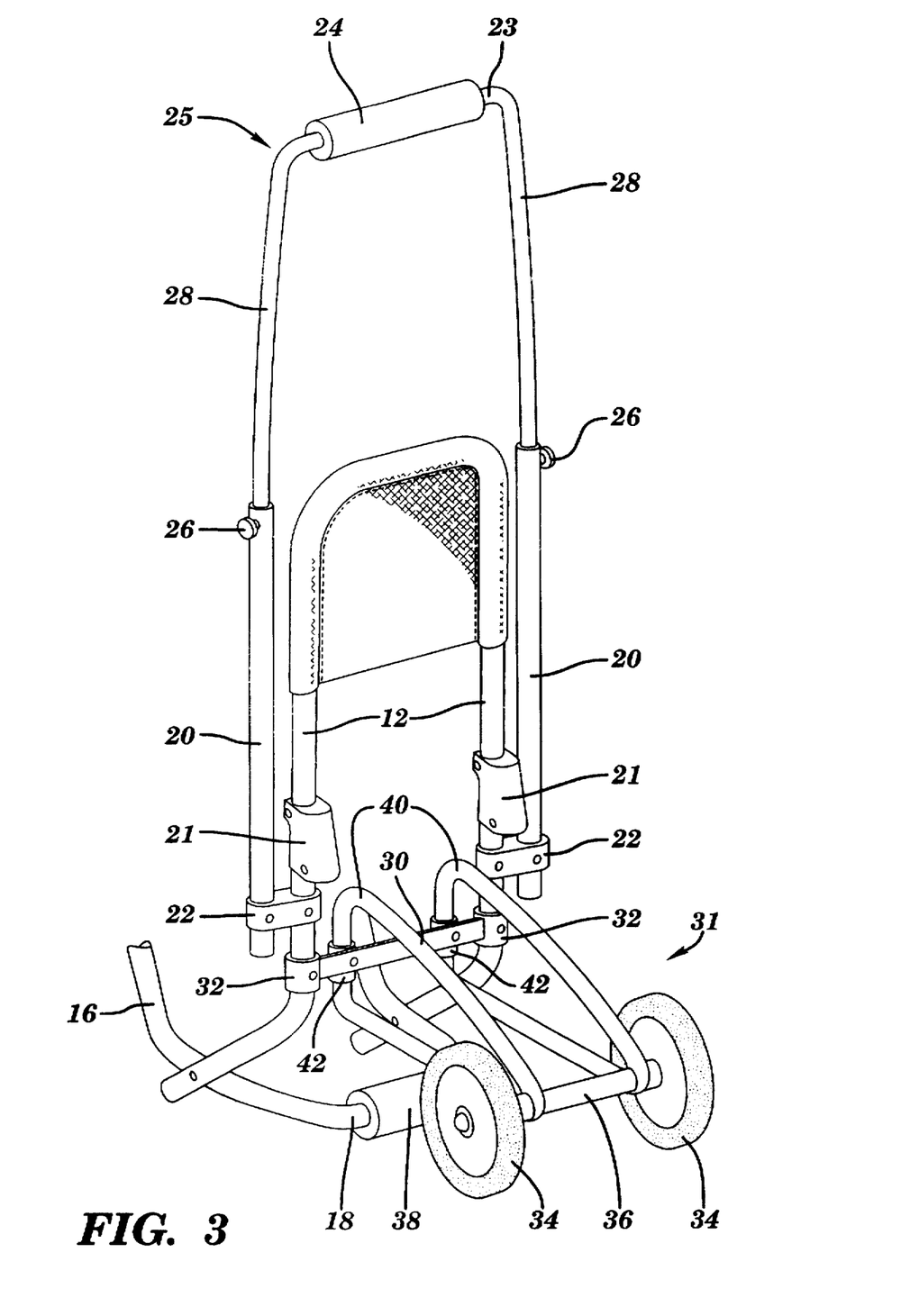
FIG. 3 is a rear view of a portion of the frame of an existing child carrier with a retrofitted wheel unit and handlebar mounted thereon.

FIG. 3 depicts the same view as FIG. 2 with the retrofit system attached thereto pursuant to this invention. In particular, this includes the attachment of handlebar apparatus 25, wheel unit 31, and protective tab 38.

Handlebar apparatus 25 is mounted to the rear support frame member 12 using handlebar mounting devices 22. The handle mounting device may incorporate a clamp, bolt, quick release system, screw device and/or any known means that will allow for easy attachment and removal. In addition, the handlebar mounting devices 22 may be adapted for mounting the handlebar unit 25 at various angles with respect to the frame member 12 (e.g., through the use of a swivel mounting).

The handlebar unit 25 may incorporate an extendable handlebar system thus allowing the height of the push bar 23 to be adjusted. The method shown incorporates upper telescoping vertical supports 28 which can slide up and down within the lower fixed supports 20. The upper support 28 can be easily locked into place by using a locking device 26. This device may utilize a peg, cotter pin, spring loaded pin mechanism, screw, wing nut or any readily available known means. While this figure depicts one type of an adjustable handlebar system, it is not meant to be exclusive. Any other known type, including an extendable, collapsible, foldable, retractable or telescoping handlebar apparatus could also be used.

Handlebar apparatus 25 may also comprise a grip 24 to fit over push bar 23. The grip may be made from rubber, plastic, tape or any other suitable material which will allow for improved gripping.

Wheel unit 31 is mounted to rear support frame member 12 using mounting devices 32. These devices are similar to the handlebar mounting devices 22. Note that an alternate embodiment may be implemented which provides a combination mounting device to attach both the handlebar apparatus and the wheel unit to rear support frame member 12 (see FIGS. 4 & 10).

The wheel unit 31 may include a support bar 30, wheel frames 40, wheels 34, an axle 36, and attachment devices 42. Any known wheel unit configuration which is light weight and readily mountable could also be used, including any of the known baby stroller/carriage art which presently exists. For instance, wheels 34 could incorporate any of the swivel type wheels frequently used in the art. In addition, wheel unit 31 could incorporate springs in the design to act as shock absorbers.

This embodiment may also incorporate a feature whereby the wheels 34 and some portion of the wheel unit may be readily separated and removed from the remaining wheel unit. For instance, attachment devices 42 may be designed such that wheel frames 40 can attach and release, slide in and out, or be clamped and unclamped from support bar 30. Thus, an alternate method of wheel attachment and removal is provided.

Finally, protective tab 38 is attachable to the bottom portion 18 of forward support frame member 16. This provides protection against wear and tear caused when that portion of forward support member 16 (or the carrier fabric or straps connected thereto) comes in contact with the ground. The protective tab may be made from any protective material such as rubber, plastic or fabric.

Figure 4:
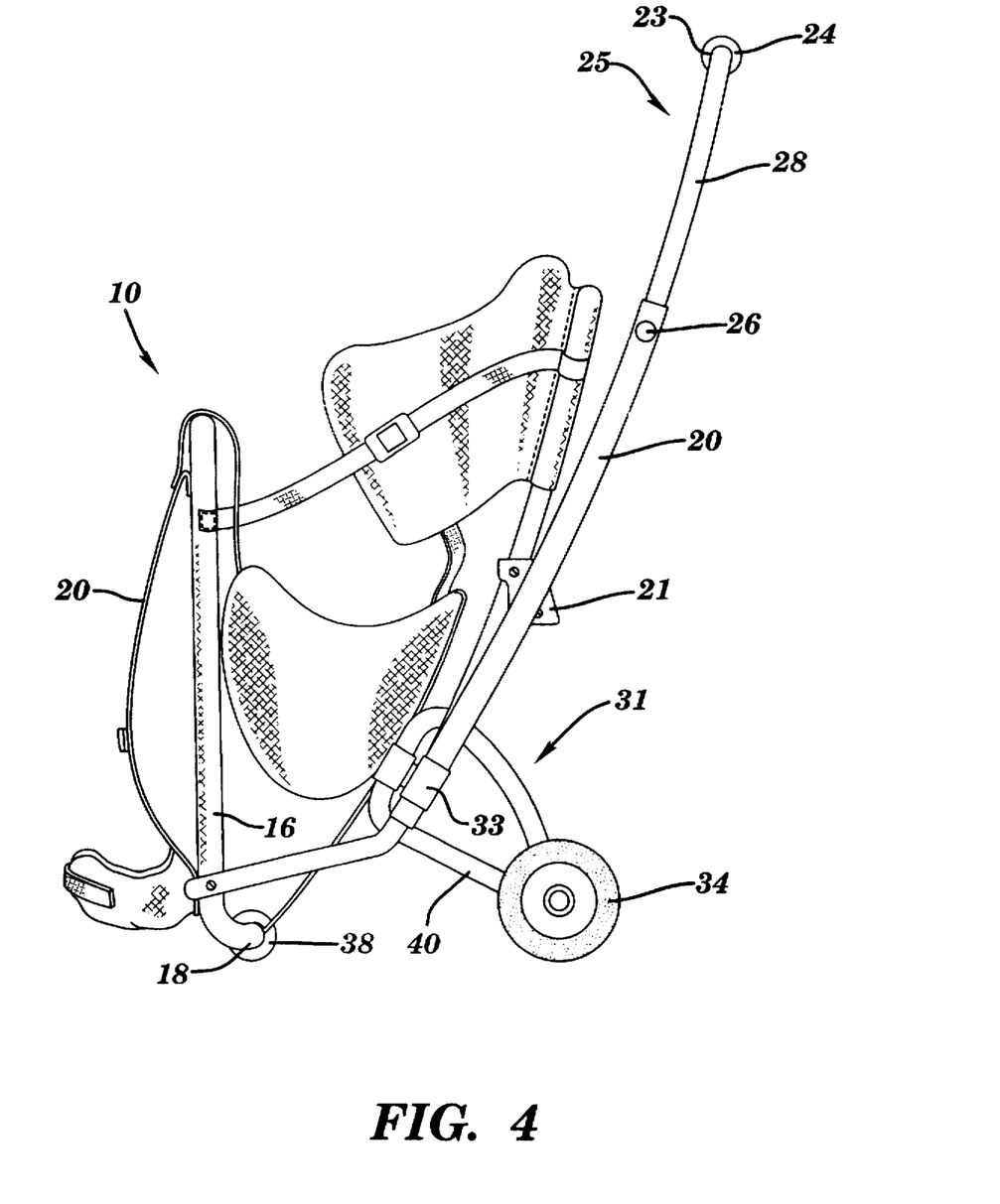
FIG. 4 is a side view of an existing child carrier with a retrofitted wheel unit and handlebar apparatus mounted thereon.
Figure 10:
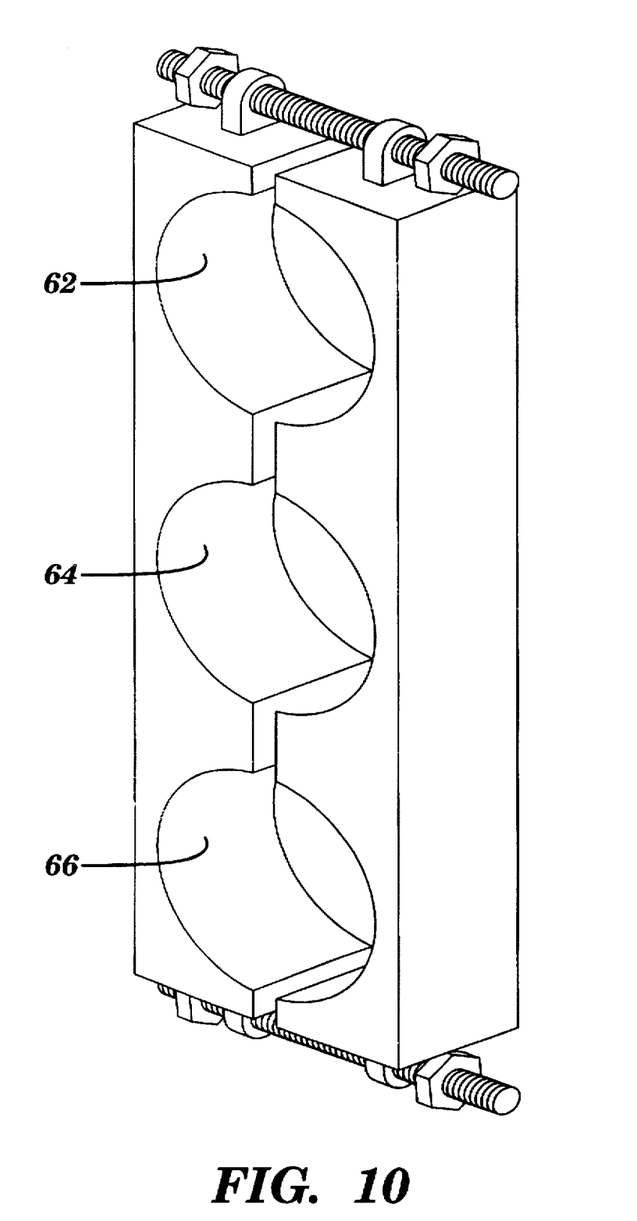
FIG. 10 depicts a three-holed clamp used to mount the present invention onto an existing child carrier.

FIG. 4 depicts a side view of a child carrier with the retrofit apparatus attached in accordance with the present invention. As shown, the wheeled carrier has affixed thereto handlebar apparatus 25, wheel unit 31 and protective tab 38. As shown in this embodiment, a single mounting device 33 is incorporated which attaches one side of both the wheel unit 31 and the handlebar apparatus 25 to rear frame support member 12. (Note that a total of two clamps, one for each side, is required). This single clamp design allows for easier attachment and removal. FIG. 10 depicts a three hole clamp suitable for this purpose. A first hole 62 clamps onto a wheel frame member, a second hole 64 clamps onto rear frame support member 12, and a third hole 66 clamps onto handlebar apparatus 25.

The retrofit system, in accordance with FIG. 4, is operational as both a back-mounted child carrier and a stroller. To use it as a stroller, one simply pulls back on the push bar 23 such that the entire weight is transferred onto wheels 34. The unit may then be effortlessly strolled. Note that in the resting position, the weight is distributed between wheels 34 and protective tab 38. In addition, note that frame stand member 14 (see FIG. 1) is not shown. It may either be disconnected or folded forward while the retrofit unit is attached.

Figure 5:
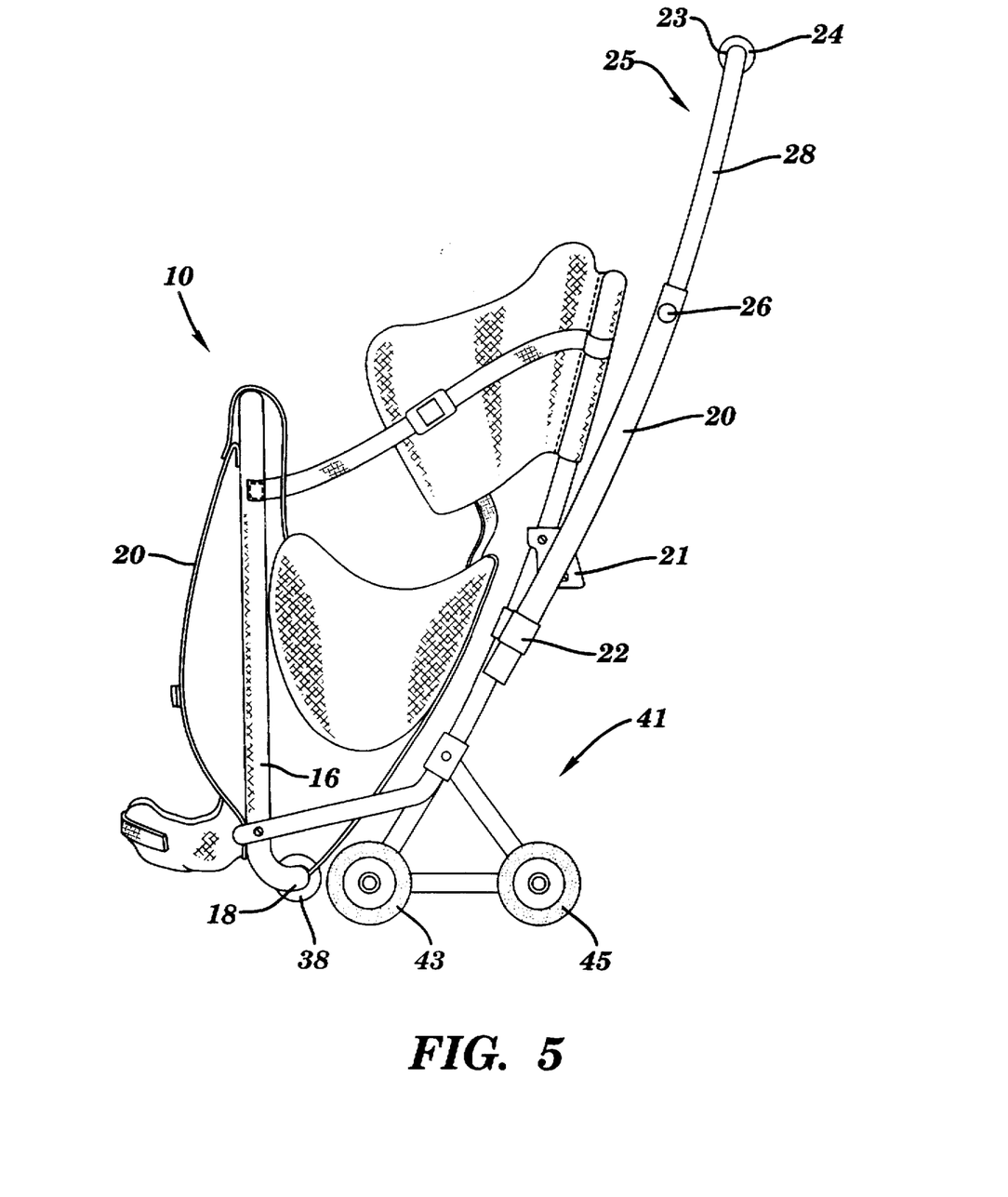
FIG. 5 is a side view showing an alternate embodiment of the wheel unit.

FIG. 5 depicts a side view of a child carrier with the attached retrofit unit incorporating an alternative wheel design. In this embodiment, a forward and a rear set of wheels, 43 and 45 respectively, are utilized within an alternate wheel unit design 41. This system provides for greater stability. This system may also incorporate wheels that lock so that the stroller is not free to roll when unattended.

Figure 6:
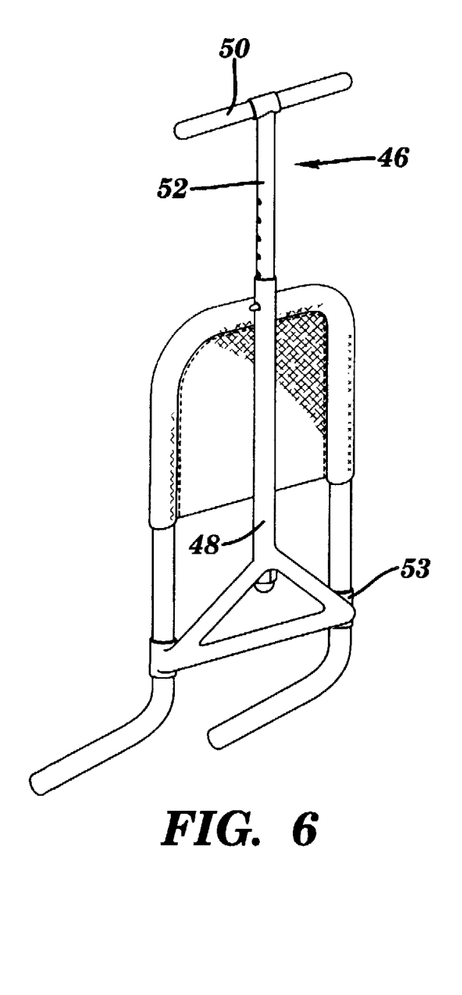
FIG. 6 is a rear view of a portion of the frame of an existing child carrier showing an alternate embodiment of the retrofitted wheel and handlebar apparatus mounted thereon.

FIG. 6 depicts a rear view of the rear frame support member with an alternative handlebar apparatus 46 design attached thereto. The handlebar apparatus as shown utilizes a single vertical support member 48 with push bar 50 attached thereto. This design may also provide an adjustable push bar height. This may be accomplished via the use of a telescoping vertical section 52 that slides up and down within the vertical support member 48. (It may also incorporate any of the extension methods described above with regard to FIG. 3). This design may be attached to the child carrier using brackets 53.

Figure 7:
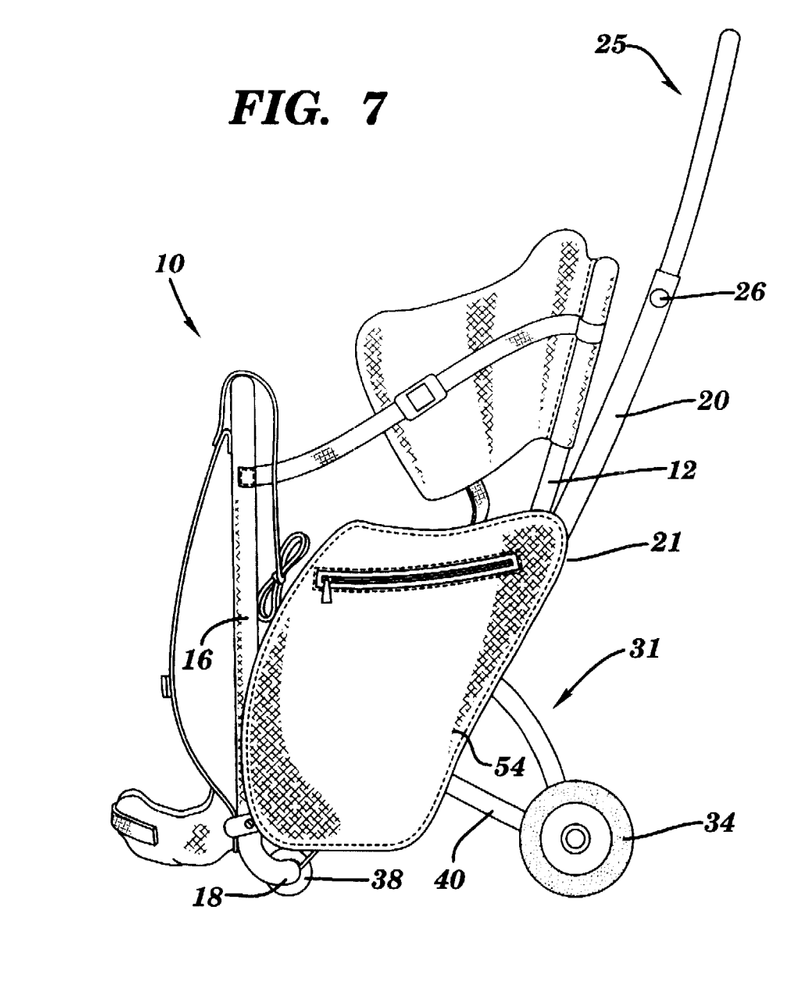
FIG. 7 is a side view of the present invention with a saddle bag mounted thereon.

FIG. 7 depicts a side view of a child carrier with attached retrofit system pursuant to this invention and further incorporating side saddle bags 54. In addition to providing additional storage, the saddle bags may be designed to provide protection to the child's feet while being strolled.

Figure 8:
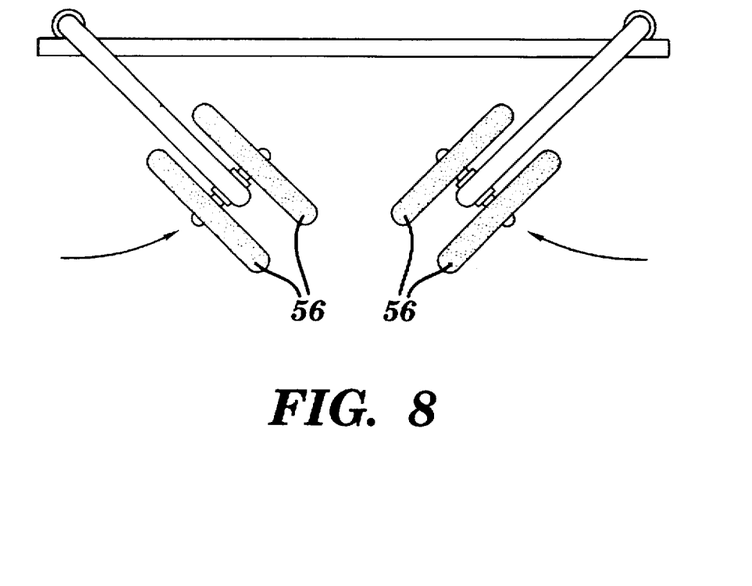
FIG. 8 depicts a first alternate embodiment for a collapsible wheel unit pursuant to the present invention.
Figure 9:
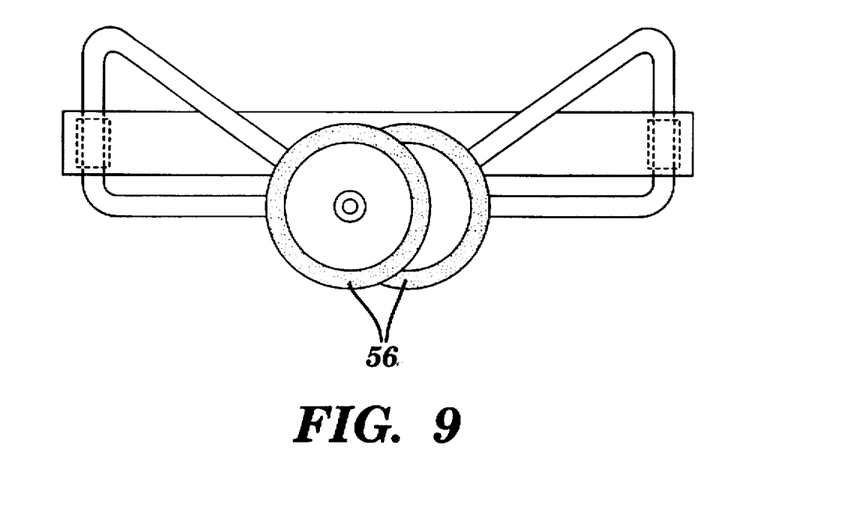
FIG. 9 depicts the collapsible wheel unit of FIG. 8 in the collapsed position.

FIGS. 8 and 9 depict a collapsible wheel system which can be incorporated into the wheel unit. As shown in FIG. 8 (top view), the wheels 56 can be collapsed inwardly when the child carrier is not being used as a stroller. In this embodiment, axle 36 of FIG. 3 is removed. To improve strength, a four wheel design (as shown) may be incorporated. FIG. 9 (rear view) depicts the wheels as fully collapsed.

Figure 11:
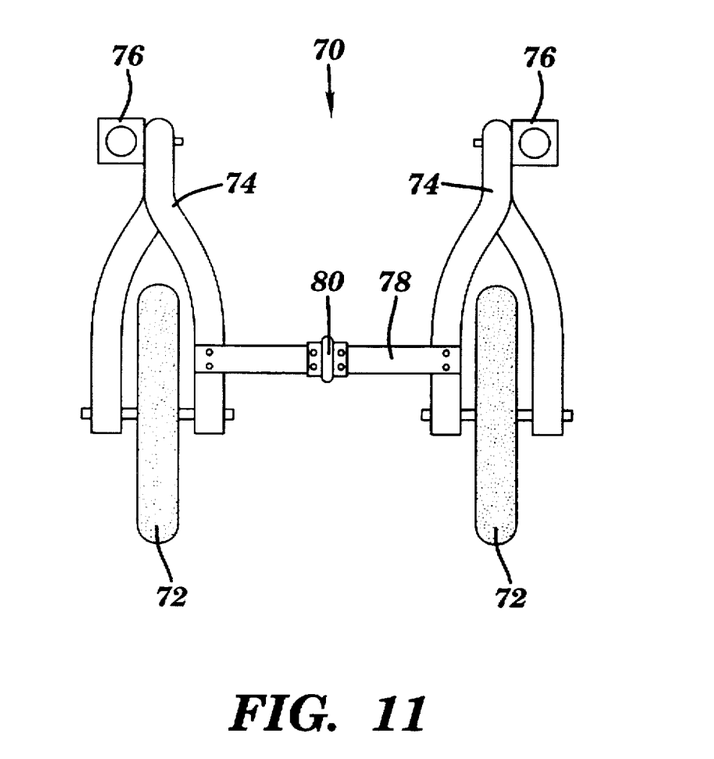
FIG. 11 depicts a second alternate embodiment for a collapsible wheel unit design pursuant to the present invention.

FIG. 11 depicts a top view of a second type of collapsible wheel frame unit 70. The unit comprises a pair of wheels 72, each mounted in its own wheel frame member 74. Each individual wheel frame member 74 may be mounted to the child carrier with clamps 76. The clamps 76 may be designed to clamp around rear frame support member 12 (see FIG. 1). The clamps 76 may be fastened via a quick release mechanism, bolts, wing nuts, or the like. Foldable bar 78 is connected interiorly to each wheel frame member 74. Foldable bar 78 comprises at least one locking hinge device 80. Locking hinge device 80 provides wheel unit 70 with the ability to collapse when the unit 70 is removed from the child carrier. When collapsed, the unit can be more easily stored or carried. Locking hinge device 80 may also incorporate a locking feature such that when the unit 70 is attached to a child carrier the hinge is locked such that foldable bar 78 becomes rigid, thereby providing increased support to the wheel unit 70.

Figure 12:
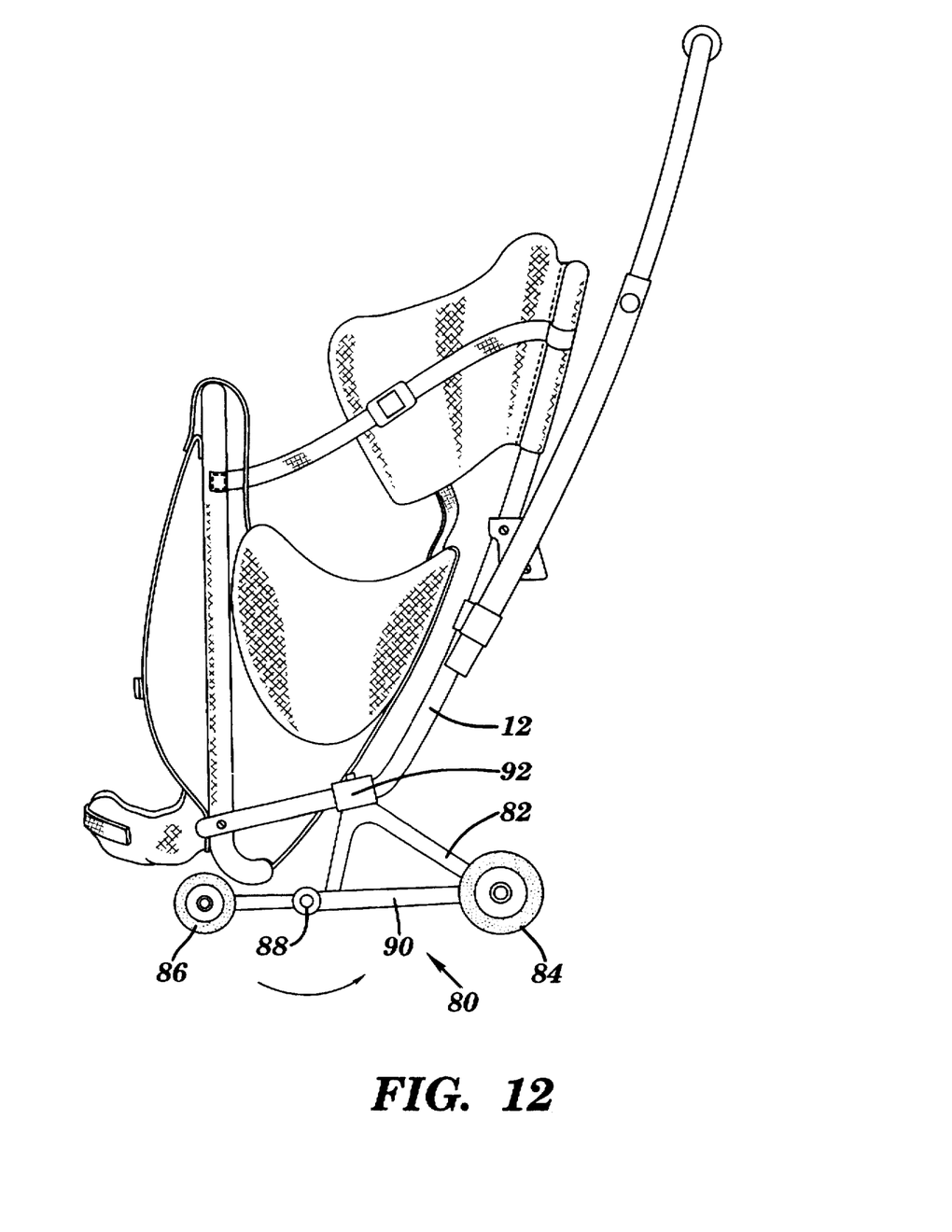
FIG. 12 depicts a third alternate embodiment for a collapsible wheel unit design pursuant to the present invention.

FIG. 12 depicts a side view of a third type of collapsible wheel frame unit 80. This embodiment comprises a front set of wheels 86 and a rear set of wheels 84. The wheel unit further comprises a collapsible platform 90 that allows the front wheels to fold underneath and up in between the rear wheels and snap up inside of wheel frame unit 82. This is accomplished via the use of a locking hinge device 88. This design allows the front wheel to be retracted when used as a carrier, and be deployed when used as a stroller. The unit may be attached to rear frame support member 12 via connector 92.

While these depictions present only a few possible collapsible wheel unit designs, it is also envisioned that any of the known baby stroller art which utilizes collapsible wheel systems could also be used.

The foregoing description of the preferred embodiments of the invention has been presented for purposes of illustration and description. It is not intended to be exhaustive or to limit the invention to the precise form disclosed, and obviously many modifications and variations are possible in light of the above teaching. Such modifications and variations that may be apparent to a person skilled in the art are intended to be included within the scope of this invention as defined by the accompanying claims.

We claim:

1. A child carrier convertible for use between a non-wheeled back-supported child carrier and a wheeled child carrier, comprising:

a frame assembly including front and rear tubular frame portions pivotally connected at lower ends thereof;

a child seat supported between the frame portions;

a shoulder harness for attaching the front frame portion to a person's back;

a removable handlebar assembly having:
  a handlebar with at least one vertical leg and a push bar adapted to be gripped by a user, and
  at least one mounting device for releasably connecting said at least one vertical leg of said handlebar to said rear frame portion;

a removable wheel unit having a pair of wheel assemblies separated by a support bar, each of said wheel assemblies includes an essentially triangular-shaped frame member with a wheel connected proximate an apex portion of said essentially triangular-shaped frame member, said essentially triangular-shaped frame member having a leg portion attached to said support bar; and a mounting device for releasably connecting opposite ends of said support bar to said rear tubular frame portion.

2. The wheeled child carrier of claim 1 wherein said vertical leg comprises a pair of vertical support members.

3. The wheeled child carrier of claim 1 wherein said vertical leg comprises a single vertical support member.

4. The wheeled child carrier of claim 1 herein said vertical leg is extendable such that die height of said push bar can be adjusted.

5. The wheeled child carrier of claim 1 wherein said push bar comprises a rubber grip for improved handling.

6. The wheeled child carrier of claim 1 wherein said wheels are detachable from said wheel assembly.

7. The wheeled child carrier of claim 1 wherein said wheel assembly is collapsible.

8. The wheeled child carrier of claim 1 wherein said removable handlebar assembly and said wheel assembly are both releasably mounted to said child carrier with a single pair of three-holed mounting devices.

9. The wheeled child carrier of claim 1 further comprising a protective tab attachable to the bottom of said back mounted child carrier.

10. The wheeled child carrier of claim 1 further comprising side saddle bags.

11. A conversion system for converting a back mounted child carrier to a wheeled child carrier wherein the back mounted child carrier comprises a frame assembly including front and rear tubular frame portions pivotally connected at lower ends thereof, a child seat supported between the frame portions and a shoulder harness for attaching the front frame portion to a person's back, said system comprising:

a removable handlebar assembly having:
  a handlebar with at least one vertical leg and a push bar adapted to be gripped by a user, and
  at least one handlebar mounting device for releasably connecting said at least one vertical leg of said handlebar to said rear frame portion;

a removable wheel unit having a pair of wheel assemblies separated by a support bar, each of said wheel assemblies includes an essentially triangular-shaped frame member with a wheel connected proximate an apex portion of said essentially triangular-shaped frame member, said essentially triangular-shaped frame portion attached to said support bar; and at least one wheel assembly mounting device for releasably connecting each of said wheel assemblies to said rear tubular frame portion.

12. The conversion system of claim 11 comprising a combination mounting device that includes said handlebar mounting device and said wheel unit mounting device.

13. The conversion system of claim 12 wherein said combination mounting device comprises a pair of three-holed clamps.

14. The conversion system of claim 11 wherein said vertical support leg is extendable thereby allowing said push bar to be raised and lowered.

\* \* \* \* \*